Figure 1:
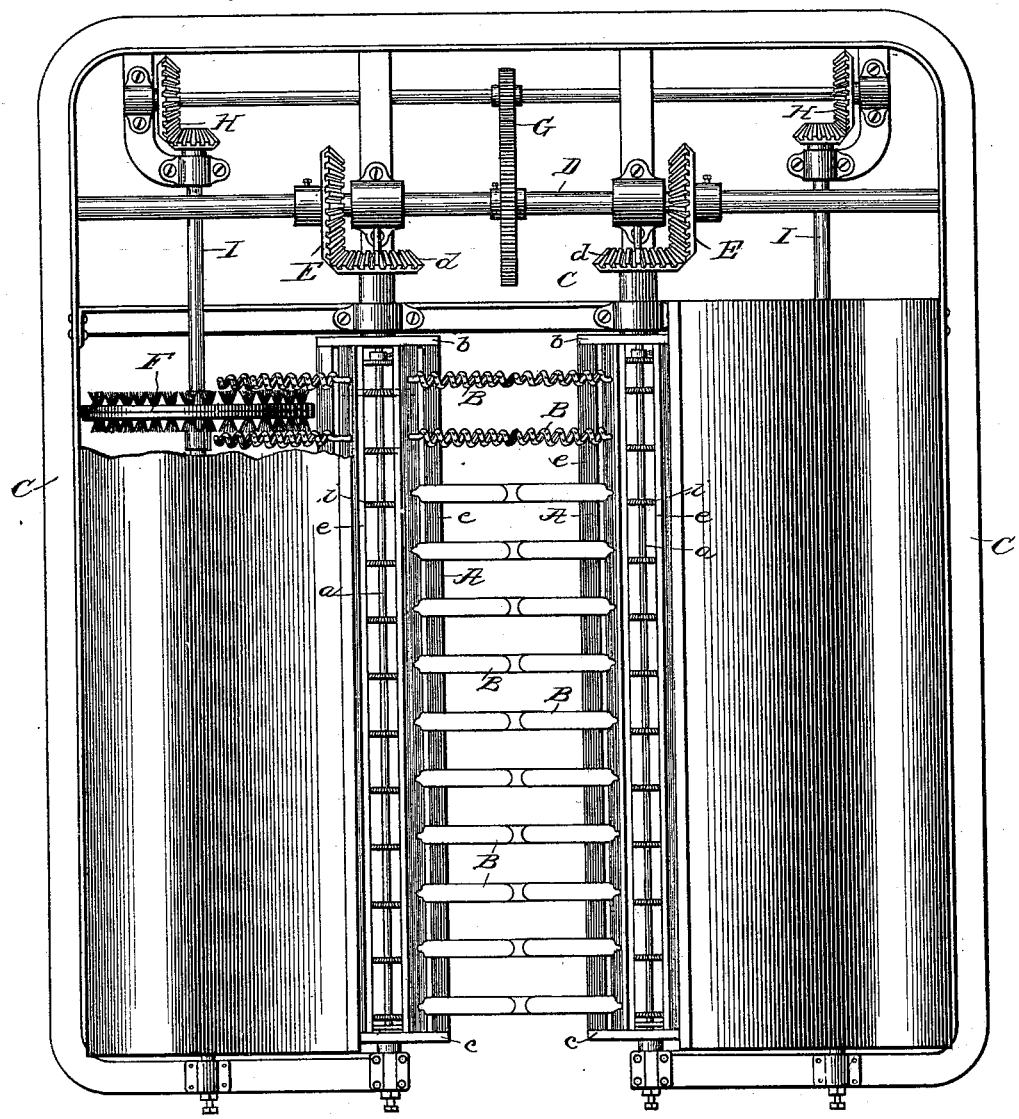

(No Model.) 3 Sheets—Sheet 1.

G. N. TODD.
COTTON HARVESTER.

No. 423,541. Patented Mar. 18, 1890.

Witnesses.

Inventor
George N. Todd
By Jno. G. Elliott
Atty.

(No Model.) 3 Sheets—Sheet 2.
G. N. TODD.
COTTON HARVESTER.
No. 423,541. Patented Mar. 18, 1890.
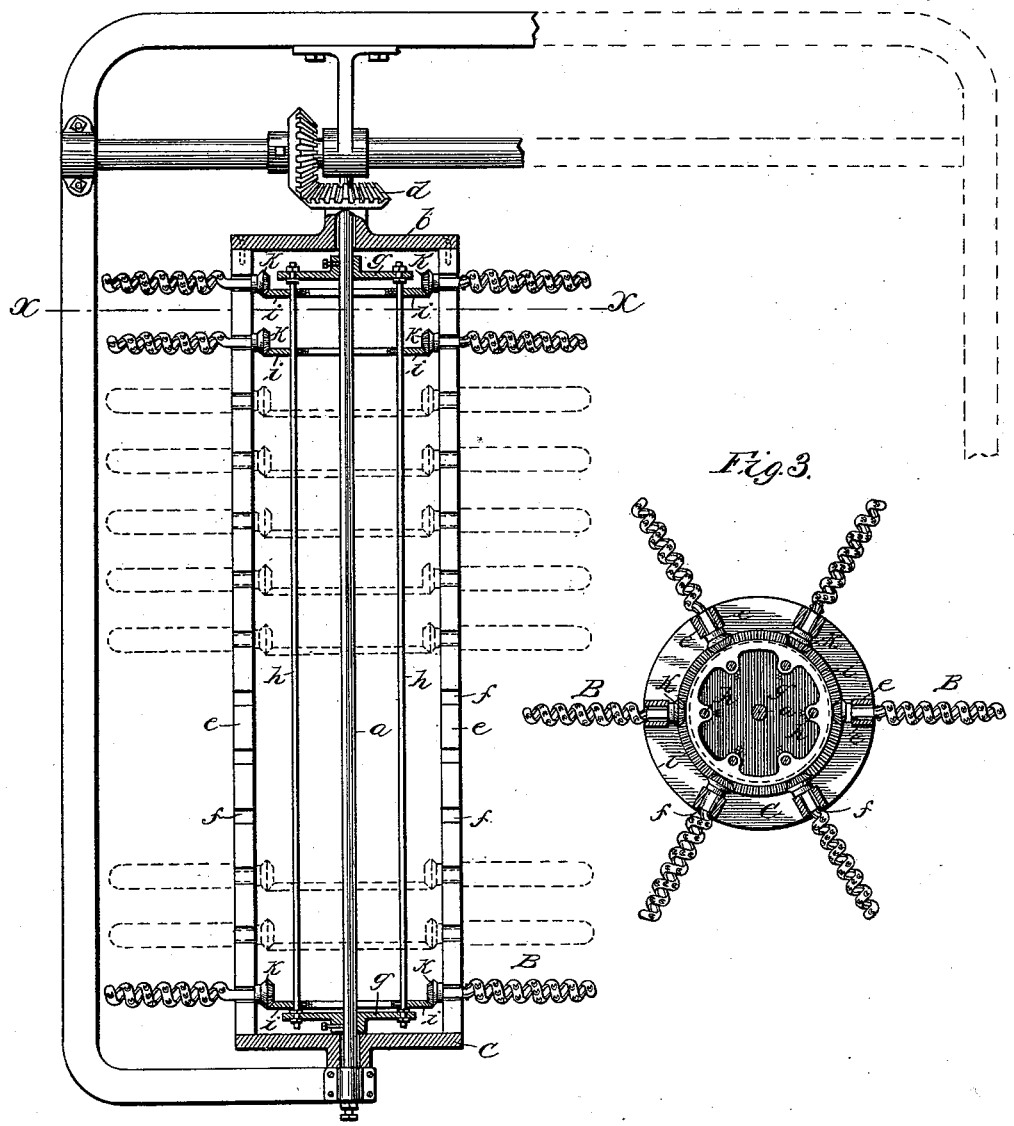

(No Model.) 3 Sheets—Sheet 3.
G. N. TODD.
COTTON HARVESTER.
No. 423,541. Patented Mar. 18, 1890.
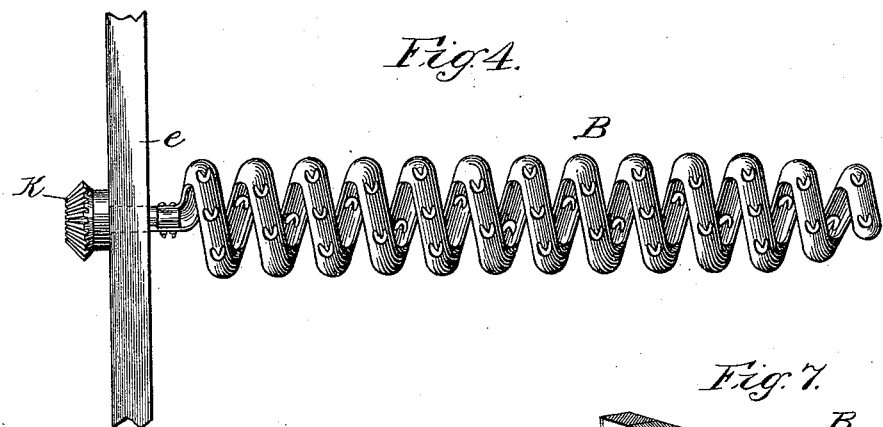
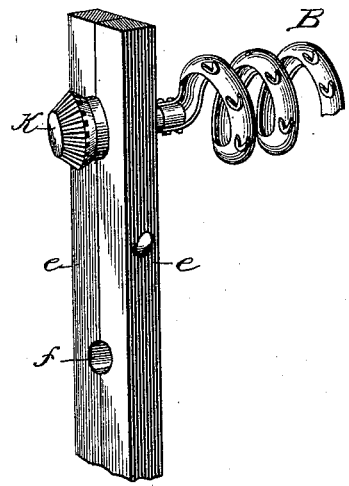
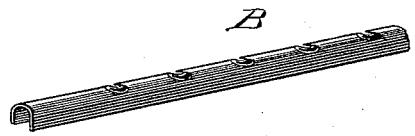
Witnesses.
Wm R Rheem
Will P. Quohundro.
Inventor.
George N Todd
By Jno G Elliott
Atty.

UNITED STATES PATENT OFFICE.

GEORGE N. TODD, OF CHICAGO, ILLINOIS, ASSIGNOR TO THE TODD COTTON HARVESTER COMPANY, OF ILLINOIS.

COTTON-HARVESTER.

SPECIFICATION forming part of Letters Patent No. 423,541, dated March 18, 1890.

Application filed December 13, 1887. Serial No. 257,761. (No model.)

*To all whom it may concern:*

Be it known that I, GEORGE N. TODD, a citizen of the United States, residing in Chicago, county of Cook, and State of Illinois, have invented certain new and useful Improvements in Cotton-Harvesters, of which the following is a specification.

This invention relates to improvements in cotton-harvesters in which the cotton is gathered by means of picker-stems thrust into and withdrawn from the cotton-plant during a portion of their continuous travel, and from which stems the gathered cotton is removed before being again thrust into the plant by passing the stem across the face of suitable cleaner devices, which latter deposit the cotton in receptacles provided for the purpose.

The prime object of this invention is to produce a cotton-harvester possessing all the advantages of prior machines in which drum-like supports are provided for the picker-stems, but at a greatly-reduced cost and materially lessened weight and friction, whereby less draft-power will be required to operate the machine and the construction thereof will be greatly improved.

A further object is to provide a picker-stem support so constructed that all the gears and mechanism connected therewith are readily accessible without the necessity for disturbing any of said parts or their connections with said support.

I attain these objects by devices illustrated in the accompanying drawings, in which—

Figure 1 represents a front view of a portion of a cotton-harvester embodying my invention; Fig. 2, a central vertical section through the picker-stem support in position in the machine, showing the cleaner devices and shields removed; Fig. 3, a detail horizontal section on line x x, Fig. 2; Fig. 4, an enlarged detail view of one of the picker-stems and a portion of its support; Figs. 5 and 6, detail views showing the blank from which the picker-stem is made; Fig. 7, a detail perspective view of a picker-stem and its support.

Similar letters of reference indicate the same parts in the several figures of the drawings.

As this application has only to do with the details of construction of a cotton-harvester, I will first briefly state the general operation of such a machine as the details may be employed in connection with, in order that the importance of such details may be more readily and fully comprehended.

The picker-stem supports A are provided with horizontal series of picker-stems B, projecting radially therefrom, for gathering the cotton, the said supports being located upon opposite sides of the machine and suitably journaled in the main frame C thereof, which latter is in turn carried upon ground-wheels, (not shown,) from which power is communicated in any well-known and convenient manner to the cross-shaft D, from which power is in turn transmitted to the picker-stem support through the medium of bevel-gears E, thereby causing said supports to rotate, and thus imparting to the stems the desired bodily movement about the axis of the support. During a portion of their bodily movement, and while out of engagement with the cotton-plant, the picker-stems are passed between or across the face of the cleaner-disks F, for the purpose of removing the gathered cotton therefrom, which disks, being preferably mounted upon vertical shafts I, are caused to rapidly rotate, and thereby discharge the cotton by means of power communicated to them from the cross-shaft D through the medium of gears G and H, or in any other suitable manner.

While I have shown these cleaner devices as disk like in form, I will here state that, so far as this invention is concerned, the cleaner devices may be of any other form or construction, so long as they will subserve the intended purpose.

From the foregoing it will be readily understood the importance of having the picker-stem supports of the lightest, strongest, and most accessible construction possible, in order that the operation of the machine may be rendered as easy as possible, and to the detail construction of these supports I will now direct attention. Mounted loosely upon a fixed vertical shaft *a* are the top and bottom plates *b c*, respectively, upon the former of which is cast or otherwise rigidly secured a gear-wheel *d*, for imparting to the support as a whole a rotary movement about the fixed shaft. These top and bottom plates are rigidly connected together and held a uniform distance apart by means of bars *e*, arranged in circular series between said plates and at regular intervals apart. These bars are preferably formed in sections or halves, bolted together, and having provided on the opposing faces of the sections, at regular intervals throughout their length, horizontal semicircular orifices *f*, which, when the sections are brought together, form circular holes through the bars, constituting bearings for the picker-stems B, which thus project radially from said bars in horizontal series.

Rigidly secured to the fixed shaft *a* immediately below and above the upper and lower plates, respectively, are circular plates *g*, connected at regular intervals by tie-rods *h*, which latter serve as additional means for strengthening the supports as a whole. To these tie-rods at regular intervals corresponding to the horizontal series of picker-stems are secured annular toothed racks *i*, into which mesh small bevel-gears K, secured to the inner ends of the picker-stems, so that when the latter are caused to have a circular bodily movement by the rotation of their supports an individual axial rotation will be imparted thereto by the engagement of said bevel-gears with the stationary circular rack. By such a construction of the picker-stem support as just described not only is the weight thereof materially reduced and the amount of power required for operating them correspondingly lessened, but all of the operating parts of the picker-stems and their supports are readily accessible without the necessity of removing any portion thereof, and any vertical series of picker-stems carried by a single bar or any single picker-stem carried by such bar may be removed without the necessity of disturbing or removing any other part of the machine; hence it will be seen that the breakage of any one or more of the picker-stems will not necessarily interfere with the operation of the machine, and that repairs to the machine—such as the renewal of a bar or picker-stem—may be made in the field and with the smallest possible loss of time.

The body of the stem—that is, the operative picking part thereof—consists of a narrow strip of sheet metal, having teeth of any suitable character stamped in or otherwise formed thereon, constituting a blank similar to that shown in Fig. 5, which is afterward bent transversely, as shown in Fig. 6, and then formed into spiral coils, as shown in Fig. 4, either by hand or some suitable mechanism designed for that purpose. The inner end of this stem is then secured to the shank of the gear K, which shank also constitutes a bearing-surface for the stem. Such stem combines all the function, strength, and effectiveness of the usual cylindrical picker-stem, but will not weigh or cost nearly so much as the old form of stem; but I may here state that this stem forms no part of this invention, and any other form of stem may be employed in connection with the mechanism herein shown and described without departing from the spirit of my invention.

In conclusion I may state that I do not desire to herein claim, broadly, a sectional stem-support the opposing adjoining faces of whose sections are provided with bearings for the picker-stems, for this feature is covered, broadly, by the claims of my application, Serial No. 218,852, filed November 15, 1886.

Having described my invention, what I claim, and desire to secure by Letters Patent, is—

1. In a cotton-harvester, a rotary picker-stem support consisting of an upper and lower plate rigidly connected by vertical sectional bars, each section of which constitutes a half-bearing for picker-stems, substantially as and for the purpose described.

2. In a cotton-harvester, a rotary picker-stem support consisting of an upper and lower plate connected by vertical sectional bars, in combination with picker-stems journaled at one end between the sections of said bars, fixed annular gears located between said bars, and gears on the inner end of the picker-stems engaging said annular gears, substantially as described.

3. In a cotton-harvester, a rotary stem-carrying support consisting of upper and lower plates, vertical bars connecting said plates, picker-stems journaled at one end in said bars, and gears on the inner ends of said stems, in combination with a fixed central rod, plates *g g*, secured upon said rod, tie-rods connecting said plates, annular gears secured to said tie-rods for engaging the gear on the picker-stems, and means for causing the picker-stem supports to rotate around the fixed and central rod, substantially as described.

GEORGE N. TODD.

Witnesses:
WILL R. OMOHUNDRO,
W. W. ELLIOTT.